No. 879,105. PATENTED FEB. 11, 1908.
J. W. JONES.
MILK COOLER.
APPLICATION FILED JULY 5, 1906.

Witnesses
A. H. Mackinnon
Horace Barnes.

Inventor
John W. Jones
By his Attorney

UNITED STATES PATENT OFFICE.

JOHN WESLEY JONES, OF AUBURN, WASHINGTON.

MILK-COOLER.

No. 879,105.  Specification of Letters Patent.  Patented Feb. 11, 1908.

Application filed July 5, 1906. Serial No. 324,874.

*To all whom it may concern:*

Be it known that I, JOHN WESLEY JONES, a citizen of the United States, residing at Auburn, in the county of King and State of Washington, have invented certain new and useful Improvements in Milk-Coolers, of which the following is a specification, reference being had therein to the accompanying drawings, in which—

Figure 1:
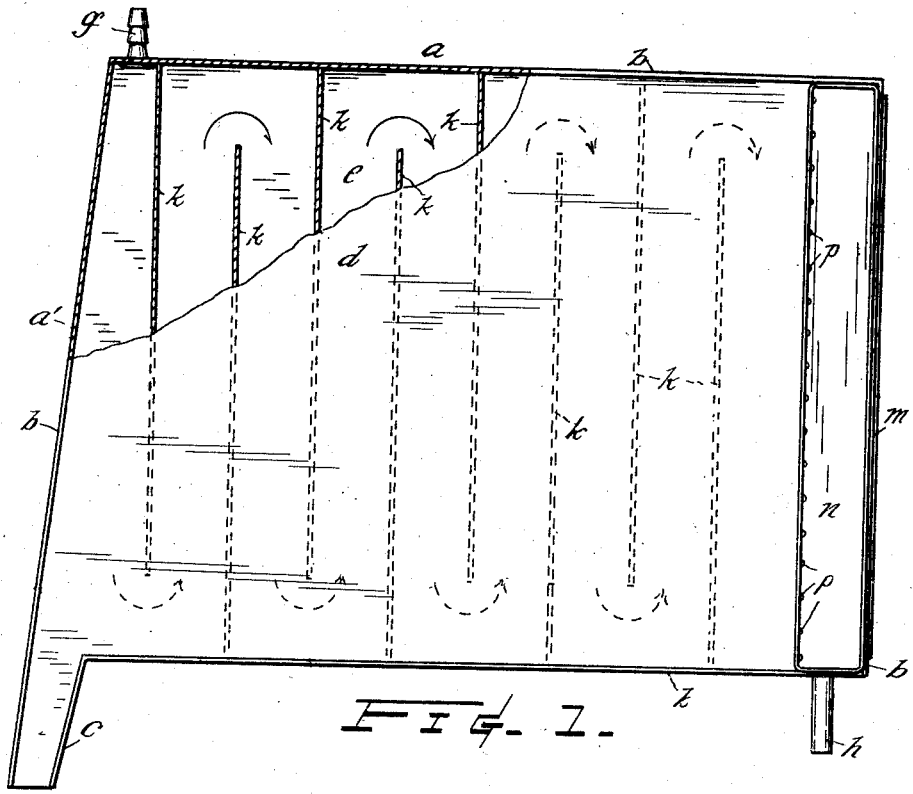
Figure 2:
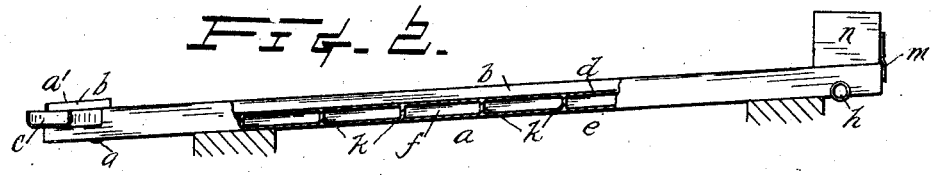
Figure 3:
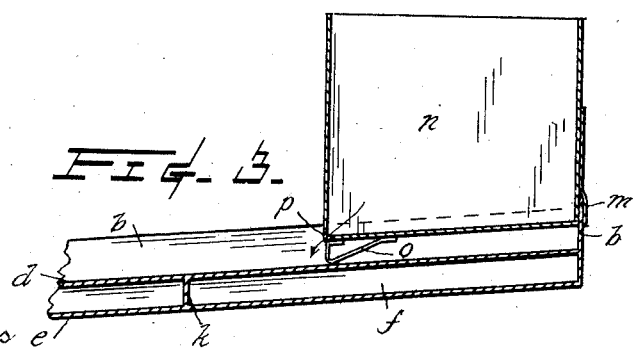

Figure 1 is a plan view of apparatus embodying my invention and shown partly broken away; Fig. 2 is a side elevation of the same, similarly treated; and Fig. 3 is an enlarged fragmentary vertical section.

My invention relates to dairy apparatus.

It is a well known fact that milk at the temperature at which it is had from the cows is susceptible, to a high degree, to becoming soured and especially so when thus placed in shipping receptacles and subjected to agitation due to transporting to the consumer or creamery. Difficulty has hitherto been experienced in the obtainment of a reliable device for effecting the cooling of the milk and one which may be had by farmers, or the like, having but a few animals.

It is the object of this invention to furnish a milk cooler of very simple and economic construction, which will be durable and efficient in operation, and adapted to accomplish the elimination of the objectionable animal heat from the milk with a relatively small consumption of water as the cooling medium.

The invention consists in the novel construction, adaptation and combination of parts as will be hereinafter described and claimed.

The reference letter $a$, in the drawings, designates a cooling pan having three rectangularly arranged edges and an oblique edge $a'$ and is provided thereabout with an upwardly extending wall $b$. In operation the pan is inclined, as represented in Fig. 2, with said oblique edge at the lower side whereby the milk is directed to a discharge spout $c$ provided at the lowermost corner. The pan is likewise provided with a two-part bottom $d$ and $e$ which parts are spaced apart to provide an intervening compartment $f$ through which the cooling water flows from the inlet nozzle $g$ at one of the lower corners to an outlet nozzle $h$ at one of the upper corners and in its passage therebetween is directed in a sinuous course by the provision of transversely arranged partitions $k$. These partitions, as will be observed in Fig. 1, do not extend entirely across the compartment and are disposed to alternately project from the opposite sides.

Detachably connected to the pan at its upper edge, as by an overlapping offset strip $m$ engaging with the pan wall thereat, is the milk receiving trough $n$ which may advantageously be supported upon legs $o$ disposed upon the opposite edge of the trough from the said strip. The trough is desirably of box-shape in cross section and at its lowest transverse corner is provided with a plurality of perforations $p$. In practice the milk is supplied to the trough, thence dribbling through said perforations it spreads in a thin film over the pan floor $d$ and thus flows toward the lower edge of the pan whereat it is led by the oblique wall to the said discharge spout to be delivered into a suitable vessel. Meanwhile the water enters the pan from the lower edge and flows, as indicated by arrows in Fig. 1, to the discharge nozzle and in so doing absorbs the heat from the milk through the intervening bottom part $d$. By such an arrangement, that is the introduction of the water along the line of the discharge of the milk, the cooling effect of the water is more effective than would be the case than if the current was reversed, as the difference in temperature between the water and the milk throughout the area of the pan bottom varies correspondingly and the cooling of the milk is gradually attained in the most effective manner and with a minimum of water. I have found that the water obtainable from ordinary wells sufficiently cool to accomplish the purposes of the invention and to be capable of rendering the milk acted upon in a fit condition for shipping or storage. The apparatus requires little attention and has proved to be valuable where used.

Having described my invention, what I claim is—

A milk cooler comprising a pan formed with four upwardly extending walls, two side walls and an end wall of said walls being disposed at right angles to one another, the other end wall of said walls being arranged obliquely to the first end wall and being of greater length than the same and extending beyond one of the side walls to form one side of a spout, the bottom of said spout being formed of a continuation of the top of said pan, the other side of said spout being formed of a continuation of one of the said side walls, a milk trough rectangular in cross section fitting between said side walls, an independent strip secured at its upper end to the outer side of said trough and at its lower end being offset and receiving the end wall opposie to the spout, said strip extending substantially the length of said trough, said trough at its front side and in alinement with its bottom having a series of perforations therein, and feet secured to the bottom of said trough and engaging the top of said pan, the height of said feet determining the inclination of the bottom of said trough with respect to the pan top.

In testimony whereof I affix my signature in presence of two witnesses.

JOHN WESLEY JONES.

Witnesses:
PIERRE BARNES,
A. H. MACKINNON